(12) United States Patent
Jiang et al.

(10) Patent No.: US 11,993,475 B2
(45) Date of Patent: May 28, 2024

(54) STRAP PULLING DEVICE AND PULLING METHOD

(71) Applicant: Wuxi Autowell Technology Co., Ltd., Jiangsu (CN)

(72) Inventors: Xiaolong Jiang, Jiangsu (CN); Cong Ma, Jiangsu (CN)

(73) Assignee: WUXI AUTOWELL TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/202,722

(22) Filed: May 26, 2023

(65) Prior Publication Data

US 2023/0382677 A1 Nov. 30, 2023

(30) Foreign Application Priority Data

May 27, 2022 (CN) .......................... 202210586405.2

(51) Int. Cl.
*B65H 35/00* (2006.01)
*H01M 50/516* (2021.01)

(52) U.S. Cl.
CPC ....... *B65H 35/008* (2013.01); *B65H 35/0093* (2013.01); *H01M 50/516* (2021.01); *B65H 2405/57* (2013.01); *B65H 2801/72* (2013.01)

(58) Field of Classification Search
CPC .............. B65H 35/008; B65H 35/0093; B65H 2405/57; B65H 2801/72; B65H 20/18; B65H 35/06; B65H 2701/11332; H01M 50/516

See application file for complete search history.

(56) References Cited

U.S. PATENT DOCUMENTS

| | | | | |
|---|---|---|---|---|
| 4,524,656 A | * | 6/1985 | Del Fabro | B23D 23/00 83/277 |
| 7,146,892 B2 | * | 12/2006 | Kienzle | B65H 20/18 83/277 |

FOREIGN PATENT DOCUMENTS

| | | | | |
|---|---|---|---|---|
| CN | 105643159 | | 6/2016 | |
| CN | 105643159 A | * | 6/2016 | ............. B23D 15/02 |
| CN | 105826427 | | 8/2016 | |
| CN | 106425182 | | 2/2017 | |
| CN | 106425182 B | * | 8/2018 | ............. B23K 37/00 |
| CN | 109352220 | | 2/2019 | |
| CN | 110695428 | | 1/2020 | |

(Continued)

*Primary Examiner* — Jonathan G Riley (57) ABSTRACT

The disclosure provides a strap pulling device, the strap pulling device comprises a cutter mechanism, a first strap pulling mechanism and a second strap pulling mechanism. The first strap pulling mechanism and the second strap pulling mechanism are configured to alternately clamp a strap at a pulling position located upstream of a cutting position and pull the strap to a transfer position located downstream the cutting position. When the first strap pulling mechanism pulls the clamped strap to the transfer position, the second strap pulling mechanism clamps the strap at the pulling position, the cutter mechanism cuts the strap at the cutting position to acquire a strap segment. When the second strap pulling mechanism pulls the clamped strap to the transfer position, the first strap pulling mechanism clamps the strap at the pulling position, the cutter mechanism cuts the strap at the cutting position to acquire a strap segment.

11 Claims, 4 Drawing Sheets

(56) References Cited

FOREIGN PATENT DOCUMENTS

| CN | 110695428 A | * | 1/2020 | ............. | B23D 15/02 |
| DE | 102015110087 A1 | * | 12/2016 | ............. | B65H 20/18 |

* cited by examiner

STRAP PULLING DEVICE AND PULLING METHOD

FIELD OF THE DISCLOSURE

The disclosure relates to the field of battery production, in particular to a strap pulling device and a pulling method.

BACKGROUND

Grid lines of multi-grid solar battery pieces are usually 2 to 6 grids, that is, 2 to 6 fixed-length straps are used side by side on one side of each battery piece. With the improvement of photoelectric conversion efficiency of battery pieces, there came dense grid battery piece having more grid lines in the market. A strap placed on the grid line needs to be pulled out from a strap reel by a strap pulling device of a soldering stringer, and to be cut into a predetermined length.

The conventional strap pulling device pulls the strap as follows: control a pulling mechanism to clamp the strap downstream of a cutter mechanism and pull the strap to a predetermined position, and then control the strap clamping mechanism upstream of the cutter mechanism, and finally control the cutter mechanism to cut the strap to acquire a strap segment. Then, the pulling mechanism is controlled to clamp the strap downstream of the cutter mechanism to pull the next strap. That is, the cutter mechanism have to wait for the strap clamping mechanism to clamp the strap before executing the cutting of the strap, and the pulling mechanism have to wait for the cutter mechanism to cut the strap before executing the pulling of the next strap. The conventional strap pulling device has a low efficiency in pulling the strap.

BRIEF SUMMARY

Aiming at the technical problem of low pulling efficiency of the conventional strap pulling device, the present disclosure provides a strap pulling device comprising a cutter mechanism, a first strap pulling mechanism and a second strap pulling mechanism.

The first strap pulling mechanism and the second strap pulling mechanism are configured to alternately clamp the strap at the pulling position located upstream of a cutting position, and pull the clamped strap to a transfer position located downstream of the cutting position.

When the first strap pulling mechanism pulls the clamped strap to the transfer position, the second strap pulling mechanism clamps the strap at the pulling position, and the cutter mechanism cuts the strap at the cutting position to acquire the strap segment having a predetermined length.

When the second strap pulling mechanism pulls the clamped strap to the transfer position, the first strap pulling mechanism clamps the strap at the pulling position, and the cutter mechanism cuts the strap at the cutting position to acquire the strap segment having the predetermined length.

In some embodiments, the first strap pulling mechanism clamps a free end of a strap and pulls the strap from a pulling position to a transfer position, and the second strap pulling mechanism moves to the pulling position to clamp the strap, such that the first strap pulling mechanism and the second strap pulling mechanism simultaneously clamp the strap. And the cutter mechanism cuts the strap at the cutting position to acquire a strap segment having a predetermined length.

In some embodiments, after the cutter mechanism cuts the strap, the second strap pulling mechanism clamps a new free end of the strap at the pulling position.

In some embodiments, the second strap pulling mechanism pulls the strap from the pulling position to the transfer position, and the first strap pulling mechanism releases the strap segment and moves to the pulling position to clamp the strap, such that the first strap pulling mechanism and the second strap pulling mechanism simultaneously clamp the strap. And the cutter mechanism cuts the strap at the cutting position to acquire another strap segment.

The strap pulling device according to the present disclosure is provided with two strap pulling mechanisms, both the strap pulling mechanisms alternately clamp the strap from the pulling position upstream of the cutter mechanism, and pull the strap to the transfer position downstream of the cutter mechanism. When one of the strap pulling mechanisms pulls the previous section of strap to the transfer position, the other strap pulling mechanism can simultaneously clamp the next section of strap at the pulling position without waiting for the cutter mechanism to cut the strap. In addition, the strap located upstream of the cutter mechanism has been clamped by the strap pulling mechanism at the pulling position, thus the cutter mechanism can cut the strap without waiting for the strap clamping mechanism to clamp the strap. Compared with a conventional strap pulling device, the strap pulling device provided by the present disclosure greatly improves the pulling efficiency of the strap.

In some embodiments, the strap pulling device further comprises a strap holding mechanism arranged between the cutting position and the transfer position. The strap pulling mechanism is configured to hold the strap pulled by the first strap pulling mechanism or the second strap pulling mechanism to the transfer position.

By arranging the strap holding mechanism, the holding and supporting of the strap guided to the transfer position is realized, and the falling of the strap is prevented.

In some embodiments, the strap holding mechanism includes a holding portion and a first lifting driving portion, wherein the holding portion is connected to the first lifting driving portion, the first lifting driving portion drives the holding portion to lift, when driven by the first lifting driving portion to descend to a low position, the holding portion avoids the first strap pulling mechanism or the second strap pulling mechanism, and when driven by the first lifting driving portion to rise to a high position, the holding portion holds the strap.

By arranging the holding mechanism, the holding mechanism can avoid the first strap pulling mechanism or the second strap pulling mechanism when the first strap pulling mechanism or the second strap pulling mechanism pulls the strap, and hold, support and guide the strap after the first strap pulling mechanism or the second strap pulling mechanism completes the strap pulling.

In some embodiments, the strap pulling device further includes a clamping mechanism arranged upstream of the pulling position, and when the first strap pulling mechanism or the second strap pulling mechanism clamps the strap at the pulling position for the first time, the clamping mechanism clamps a free end of the strap.

By arranging the clamping mechanism, when the first strap pulling mechanism or the second strap pulling mechanism pulls the strap for the first time, the clamping mechanism realizes the clamping and positioning of the free end of the strap.

In some embodiments, the cutter mechanism includes a cutter and a second lifting driving portion, wherein the cutter is connected to the second lifting driving portion, and the second lift driving part is configured to drive the cutter to lift, when driven by the second lifting driving portion to descend to a low position, the cutter avoids the first strap pulling mechanism or the second strap pulling mechanism, and when driven by the second lifting driving portion to rise to a high position, the cutter cuts the strap.

By arranging the cutter mechanism, the cutter mechanism can avoid the first strap pulling mechanism or the second strap pulling mechanism when the first strap pulling mechanism or the second strap pulling mechanism pulls the strap, and cut the strap after the first strap pulling mechanism or the second strap pulling mechanism completes the strap pulling.

In some embodiments, the strap pulling device further comprises a strap transfer mechanism, wherein the strap transfer mechanism is configured to clamp the strap pulled by the first strap pulling mechanism or the second strap pulling mechanism to the transfer position, and to pull the acquired strap segment to a downstream position.

By arranging the strap transfer mechanism, the receiving the strap pulled to the transfer position is realized, and the strap segment acquired by cutting is automatically transferred to the downstream position.

In some embodiments, the strap transfer mechanism includes a third strap pulling mechanism and a fourth strap pulling mechanism, the third strap pulling mechanism and the fourth strap pulling mechanism alternately clamp the strap from the transfer position, and pull the strap segment to the downstream position.

The third strap pulling mechanism and the fourth strap pulling mechanism alternately clamp the strap from the pulling position, and pull the strap segment to the downstream position, thus the transfer efficiency of the strap is improved.

In some embodiments, the strap pulling device further comprises a mounting base, a first guide rail and a second guide rail, wherein the first guide rail and the second guide rail are arranged side by side on the mounting base along an extending direction of the strap, the first strap pulling mechanism and the fourth strap pulling mechanism are slidably mounted on the first guide rail, the first strap pulling mechanism slides along the first guide rail to realize the position switching between the pulling position and the transfer position, the fourth strap pulling mechanism slides along the first guide rail to realize position switching between the transfer position and the downstream position, and the second strap pulling mechanism and the third strap pulling mechanism are slidably mounted on the second guide rail, the second strap pulling mechanism slides along the first rail to realize position switching between the pulling position and the transfer position, the third strap pulling mechanism slides along the second guide rail to realize position switching between the transfer position and the downstream position.

By arranging the mounting base, the first guide rail and the second guide rail, the first strap pulling mechanism, the second strap pulling mechanism, the third strap pulling mechanism and the fourth strap pulling mechanism is slidably mounted, so that each strap pulling mechanism can move and switch between the corresponding target positions respectively to complete the corresponding actions.

In some embodiments, the first strap pulling mechanism, the second strap pulling mechanism, the third strap pulling mechanism, and the fourth strap pulling mechanism all include a sliding bracket, a mounting plate, a clamping driving mechanism, a first clamping mechanism and a second clamping mechanism, wherein the sliding bracket is connected to the first guide rail or the second guide rail, and the mounting plate is mounted on the sliding bracket, the first clamping mechanism includes a clamping plate slidably mounted on the mounting plate and a plurality of first jaws arranged on the first clamping plate, the second clamping mechanism includes a second plate fixedly mounted on the mounting plate and a plurality of second jaws arranged on the second clamping plate, the first jaw and the second jaw are arranged at intervals, and the adjacent first jaw and the second jaw constitute a group of jaw members, the clamping driving mechanism is configured to drive the first clamping plate to translate relative to the second clamping plate, so that the first jaw and the second jaw in each group of the jaw members are clamped or separated, to clamp or release one strap.

Through the cooperation of the first clamping mechanism and the second clamping mechanism, the strap pulling mechanism realizes synchronous clamping and synchronous pulling of a plurality of straps, thus the pulling efficiency of the straps is improved.

In some embodiments, a first strap clamping groove is provided on a clamping surface of the first jaw, and a second strap clamping groove corresponding to the first strap clamping groove is provided on a clamping surface of the second jaw, when the first jaw and the second jaw are clamped, the first strap clamping groove and the second strap clamping groove cooperate to clamp the strap.

By arranging the first strap clamping groove and the second strap clamping groove on the first jaw and the second jaw, when clamping a flat strap, the flat strap enters and is clamped in the clamping groove, so as not to curl and deform.

The present disclosure also provides a strap pulling method comprising:
    controlling a first strap pulling mechanism and a second strap pulling mechanism to clamp a strap at a pulling position located upstream of a cutting position, and pull the clamped strap to a transfer position located downstream of the cutting position;
    controlling the second strap pulling mechanism to clamp the strap at the pulling position when the first strap pulling mechanism pulls the strap to the transfer position;
    controlling a cutter mechanism to cut the strap at the cutting position to acquire a strap segment having a predetermined length;
    controlling the second strap pulling mechanism to pull the clamped strap to the transfer position; and
    controlling the first strap pulling mechanism to clamp the strap at the pulling position and execute the pulling of the next section of the strap when the second strap pulling mechanism pulls the strap to the transfer position.

By using the strap pulling device according to an embodiment of the present disclosure, two strap pulling mechanism is controlled to alternately clamp the strap from the pulling position upstream of the cutter mechanism, and pull the strap to the transfer position downstream of the cutter mechanism. When one of the strap pulling mechanisms pulls the previous section of strap to the transfer position, the other strap pulling mechanism can simultaneously clamp the next section of strap at the pulling position without waiting for the cutter mechanism to cut the strap. In addition, the strap located upstream of the cutter mechanism has been clamped by the strap pulling mechanism at the pulling position, thus the cutter mechanism can cut the strap without waiting for the strap clamping mechanism to clamp the strap. Thereby, the pulling efficiency of the strap is greatly improved.

In some embodiments, the strap pulling method further comprises: controlling, when the first strap pulling mechanism or the second strap pulling mechanism pulls the strap to the transfer position, a strap transfer mechanism to clamp an end of the strap located at the transfer position and pull the strap segment to downstream position.

The receiving the strap pulled to the transfer position is realized, and the strap segment acquired by cutting is automatically transferred to the downstream position.

DETAILED DESCRIPTION

In order to make the above described objects, features and advantages of the present disclosure more clearly and easy to understood, the present disclosure will be described in further detail below with reference to the accompanying drawings and specific embodiments.

Aiming at the technical problem of low pulling efficiency of the conventional strap pulling device, the present disclosure provides the strap pulling device, which greatly improves the pulling and laying efficiency of the strap.

Figure 1:
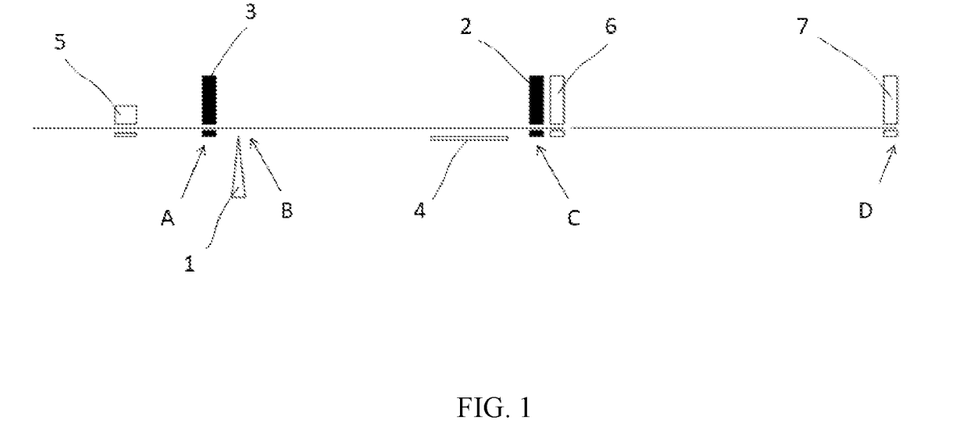
FIG. 1 is a schematic structural view of a strap pulling device in a working state according to an embodiment of the present disclosure.
Figure 2:
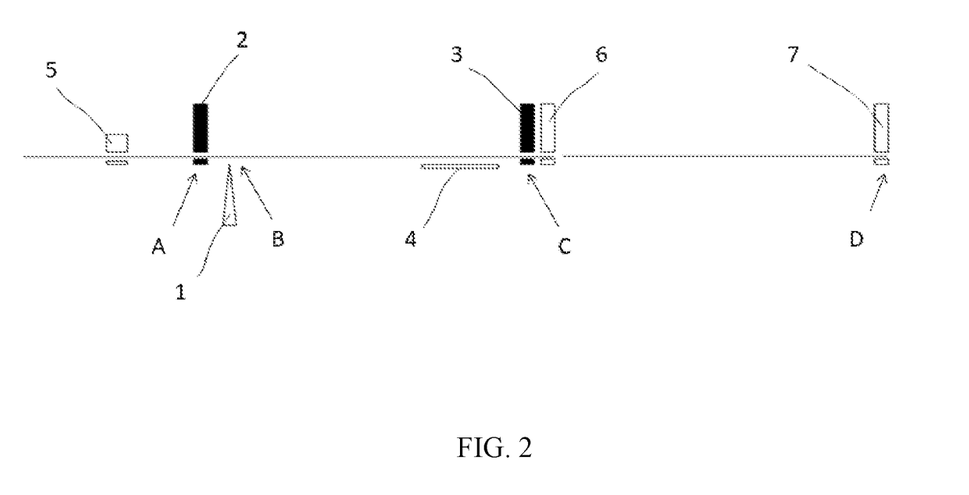
FIG. 2 is a schematic structural view of the strap pulling device in another working state according to an embodiment of the present disclosure.

As illustrated in FIG. 1 to FIG. 2, the strap pulling device according to an embodiment of the present disclosure includes a cutter mechanism 1, a first strap pulling mechanism 2, and a second strap pulling mechanism 3.

The first strap pulling mechanism 2 and the second strap pulling mechanism 3 are configured to alternately clamp the strap at the pulling position A located upstream of a cutting position B, and pull the clamped strap to a transfer position C located downstream of the cutting position B.

When the first strap pulling mechanism 2 pulls the clamped strap to the transfer position C, the second strap pulling mechanism 3 clamps the strap at the pulling position A, and the cutter mechanism 1 cuts the strap at the cutting position B to acquire a strap segment having a predetermined length.

When the second strap pulling mechanism 3 pulls the clamped strap to the transfer position C, the first strap pulling mechanism 2 clamps the strap at the pulling position A, and the cutter mechanism 1 cuts the strap at the cutting position B to acquire the strap segment having the predetermined length.

In order to enable those skilled in the art to more clearly understand the technical scheme of the present disclosure, the working process of the strap pulling device according to an embodiment of the present disclosure will be described in more detail with reference to FIG. 1 and FIG. 2.

Before the strap pulling is officially started, a free end of the strap needs to be pulled and positioned at the pulling position A from the strap coil. Then start to perform the strap pulling operation as follows:

The first strap pulling mechanism 2 clamps the free end of the strap from the pulling position A, and pulls the clamped strap to the transfer position C. At the same time, the second strap pulling mechanism 3 moves to the pulling position A to clamp the strap. At this point, as illustrated in FIG. 1, the second strap pulling mechanism 3 and the first strap pulling mechanism 2 simultaneously clamp the strap from a front side and a rear side of the cutting position B.

The cutter mechanism 1 cuts the strap at the cutting position B, thereby obtaining one strap segment. At this point, a new free end of the strap is clamped in the second strap pulling mechanism 3.

Then, the second strap pulling mechanism 3 pulls the clamped strap to the transfer position C. At the same time, the first strap pulling mechanism 2 releases the strap segment, moves to the pulling position A and clamps the strap. At this point, as illustrated in FIG. 2, the first strap pulling mechanism 2 and the second strap pulling mechanism 3 simultaneously clamp the strap from the front side and the rear side of the cutting position B.

The cutter mechanism 1 cuts the strap at the cutting position B, thereby obtaining another strap segment. At this point, a new free end of the strap is clamped in the first strap pulling mechanism 2.

By repeatedly performing the pulling and cutting process described above, the strap segments can be acquired alternately, and the strap segments can be pulled to the transfer position C.

Of course, after pulling the free end of the strap to the pulling position A, the second strap pulling mechanism 3 may also perform the strap pulling action first.

It can be seen that in the strap pulling device according to the present disclosure, the first strap pulling mechanism 2 and the second strap pulling mechanism 3 alternately clamp the strap from the pulling position A upstream of the cutter mechanism 1, and pull the strap to the transfer position C downstream of the cutter mechanism 1. In particular, when one of the strap pulling mechanisms pulls the previous section of strap to the transfer position C, the other strap pulling mechanism can simultaneously clamp the next section of strap at the pulling position A without waiting for the cutter mechanism to cut the strap. In addition, the strap located upstream of the cutter mechanism 1 has been clamped by the strap pulling mechanism at the pulling position A, thus the cutter mechanism 1 can cut the strap without waiting for the strap clamping mechanism to clamp the strap.

Compared with the conventional strap pulling device, the strap pulling device provided by an embodiment of the present disclosure greatly improves the pulling efficiency of the strap and saves the strap feeding time.

Continuously reference to FIG. 1 and FIG. 2, optionally, the strap pulling device according to an embodiment of the present disclosure further includes a strap holding mechanism 4 arranged between the cutting position B and the transfer position C. When the first strap pulling mechanism 2 and the second strap pulling mechanism 3 pull the strap to the transfer position C, the strap holding mechanism 4 is configured to hold the strap upward, so as to support the strap and prevent the falling of the strap.

Optionally, the strap holding mechanism 4 includes a holding portion and a first lifting driving portion, wherein the holding portion is connected to the first lifting driving portion, and the first lifting driving portion drives the lift portion to lift.

Optionally, a strap guide groove is provided on the holding portion, and the strap guiding groove is configured to guide and position the strap and prevent the strap from being horizontally displaced.

When the first strap pulling mechanism 2 and the second strap pulling mechanism 3 are performing strap pulling, and the holding portion is driven by the first lifting driving portion to descend to a low position, the first strap pulling mechanism 2 and the second strap pulling mechanism are avoided. After the first strap pulling mechanism 2 and the second strap pulling mechanism 3 complete the strap pulling action, the holding portion is driven by the first lifting driving portion to rise to a high position, so as to hold and support the strap.

As mentioned above, when the first strap pulling mechanism 2 or the second strap pulling mechanism 3 pulls the strap from the pulling position A for the first time, the free end of the strap needs to be pulled and positioned to the pulling position A.

In order to be able to position the free end of the strap at the pulling position A before the first strap pulling mechanism 2 or the second strap pulling mechanism 3 pulls for the first time, optionally, the strap pulling device according to an embodiment of the present disclosure further includes a clamping mechanism 5 arranged upstream of the pulling position A. When the first strap pulling mechanism 2 or the second strap pulling mechanism 3 clamps the strap at the pulling position A for the first time, the clamping mechanism 5 clamps the free end of the strap, so as to clamp and position the free end of the strap.

Optionally, the cutter mechanism 1 includes a cutter and a second lifting driving portion, wherein the cutter is connected to the second lifting driving portion, and the second lifting driving portion is configured to drive the cutter to lift.

When the first strap pulling mechanism 2 and the second strap pulling mechanism 3 are performing strap pulling, and when the cutter is driven by the second lifting driving portion to descend to a low position, the first strap pulling mechanism 2 or the second strap pulling mechanism 3 are avoided. When it is necessary to cut the strap, the cutter is driven by the second lifting driving portion to a high position, so as to contact and cut the strap.

Optionally, the strap pulling device according to an embodiment of the present disclosure further includes a strap transfer mechanism. The strap transfer mechanism is configured to clamp the strap pulled to the transfer position C, by the first strap pulling mechanism 2 or the second strap pulling mechanism 3, and pull the acquired strap segment onto the downstream position D.

That is, when the first strap pulling mechanism 2 and the second strap pulling mechanism 3 pull the strap to the transfer position C, the strap transfer mechanism receives and clamps the free end of the strap, and then pull the strap segment acquired by cutting to the downstream position D. Of course, when the strap transfer mechanism clamps the strap, the strap may or may not have been cut.

Continuously reference to FIG. 1 to FIG. 2, in order to receive the strap pulled by the first strap pulling mechanism 2 and the second strap pulling mechanism 3 in time, and improve the transmission efficiency. Optionally, the strap transfer mechanism includes a third strap pulling mechanism 6 and a fourth strap pulling mechanism 7, the third strap pulling mechanism 6 and the fourth strap pulling mechanism 7 are alternately clamp the strap from the transfer position C, and pull the strap segment to the downstream position D.

Figure 3:
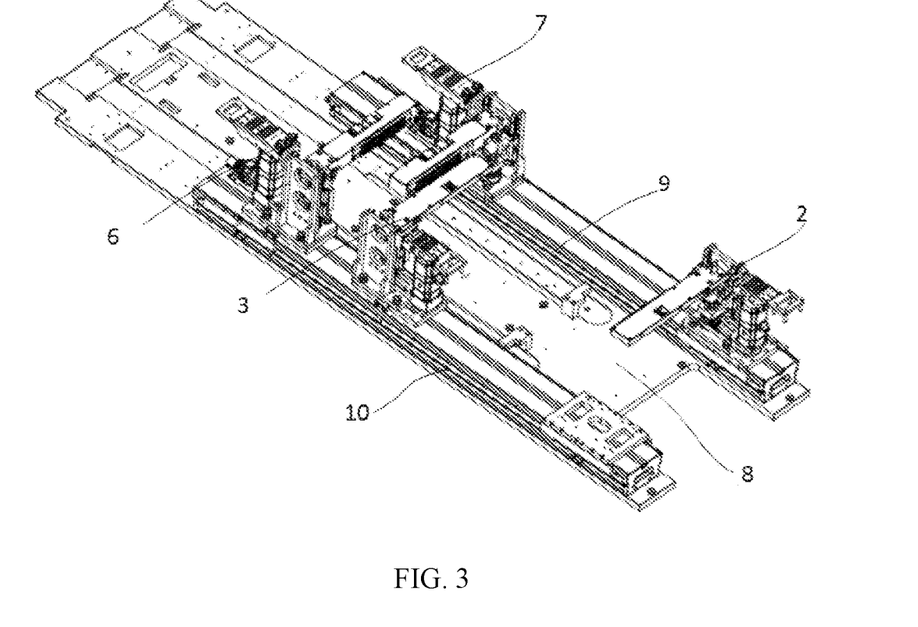
FIG. 3 is a schematic structural view of some components of the strap pulling device according to an embodiment of the present disclosure from a visual angle.
Figure 4:
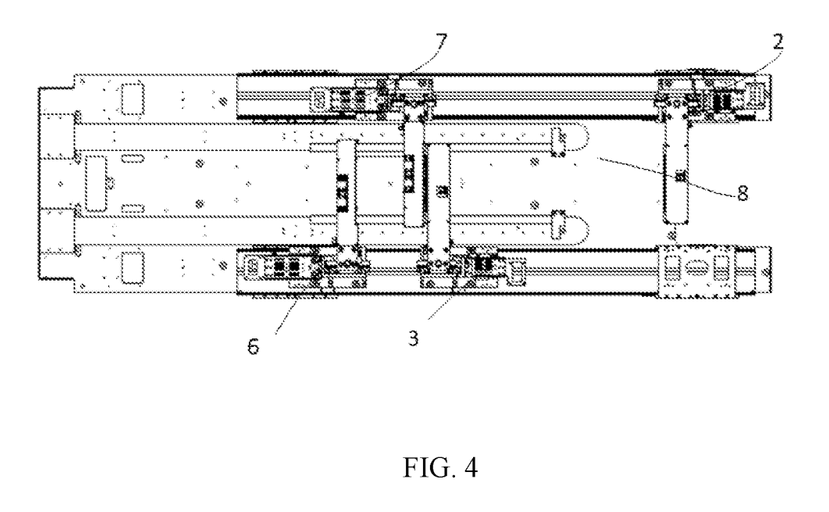
FIG. 4 is a schematic structural view of some components of the strap pulling device according to an embodiment of the present disclosure from another visual angle.

As illustrated in FIG. 3 to FIG. 4, optionally, the strap pulling device according to an embodiment of the present disclosure further comprises a mounting base 8, a first guide rail 9, and a second guide rail 10.

The first guide rail 9 and the second guide rail 10 are arranged side by side on the mounting base 8 along an extending direction of the strap.

The first strap pulling mechanism 2 and the fourth strap pulling mechanism 7 are slidably mounted on the first guide rail 9, the first strap pulling mechanism 2 slides along the first guide rail 9 to realize position switching between the pulling position A and the transfer position C, the fourth strap pulling mechanism 7 slides along the first guide rail 9 to realize position switching between the transfer position C and the downstream position D. The second strap pulling mechanism 3 and the third strap pulling mechanism 6 are slidably mounted on the second guide rail 9, and the second strap pulling mechanism 3 slides along the second guide rail 9 to realize position between the pulling position A and the transfer position C, the third strap pulling mechanism 6 slides along the second guide rail 9 to realize position switching between the transfer position C and the downstream position D.

It can be seen that by arranging the mounting base 8, the first guide rail 9 and the second guide rail 10, the first strap pulling mechanism 2, the second strap pulling mechanism 3, the third strap pulling mechanism 6 and the fourth strap pulling mechanism 7 are integrated and slidably mounted, so that each strap pulling mechanism can move and switch between the corresponding target positions respectively to complete the corresponding actions.

Optionally, the first strap pulling mechanism 2, the second strap pulling mechanism 3, the third strap pulling mechanism 6 and the fourth strap pulling mechanism 7 may adopt the same structure.

Figure 5:
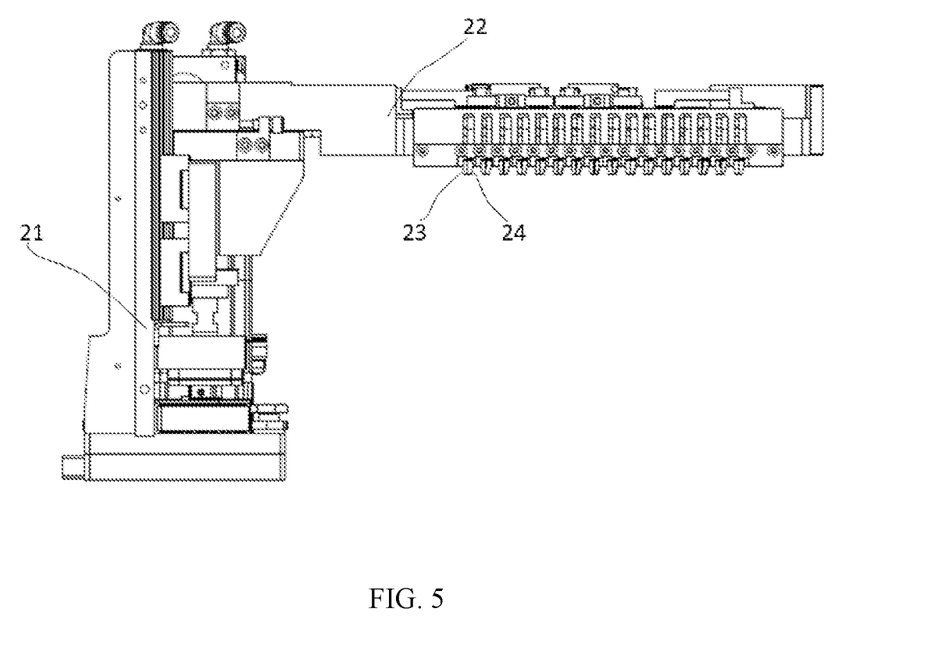
FIG. 5 is a schematic structural view of a soldering pulling mechanism according to an embodiment of the present disclosure.

Taking the first strap pulling mechanism 2 as an example, as illustrated in FIG. it includes a sliding bracket 21, a mounting plate 22, a clamping driving mechanism, a first clamping mechanism, and a second clamping mechanism.

The sliding bracket 21 is connected to the first guide rail 8 or the second guide rail 9, and the mounting plate 22 is mounted on the sliding bracket 21. The first clamping mechanism includes a first clamping plate slidably mounted on the mounting plate 22 and a plurality of first jaws 23 arranged on the first clamping plate. The second clamping mechanism includes a second clamping plate fixedly mounted on the mounting plate 22 and a plurality of second jaws 24 arranged on the second clamping plate, the first jaw and the second jaw are arranged at intervals, and the adjacent first jaw and the second jaw constitute a group of jaw members. In the embodiment of FIG. 5, the numbers of the first jaws 23 and the second jaws 24 are sixteen respectively, and correspondingly, sixteen groups of jaw members are formed to realize the simultaneous pulling of sixteen straps. Of course, other number of jaw members may be set to other numbers. Generally, the number of jaw members is equal to the number of straps included in a strap group to be pulled.

A driving end of the clamping driving mechanism is connected with the first clamping plate, which is configured to drive the first clamping plate to translate relative to the second clamping plate, so that the first jaw 23 and the second jaw 24 in each group of jaw members are clamped or separated, to clamp or release the corresponding strap.

Generally, the strap is divided into two groups: round strap and flat strap. When the flat strap is in a horizontal state, the first jaw 23 and the second jaw 24 directly clamp the flat strap, which may easily cause the flat strap to curl and deform. To solve this problem, optionally, a clamping surface of the first jaw 23 is provided with a first strap clamping groove, and a clamping surface of the second jaw 24 is provided with a second strap clamping groove corresponding to the first strap clamping groove, when the first jaw 23 and the second jaw 24 clamp the flat strap, the flat strap enters and is clamped in the first strap clamping groove and the second strap clamping groove.

Of course, the first strap pulling mechanism 2, the second strap pulling mechanism 3, the third strap pulling mechanism 6, and the fourth strap pulling mechanism 7 may adopt different structures. For example, in some embodiments, the first strap pulling mechanism 2 and the second strap pulling mechanism 3 adopt structures illustrated in FIG. 5, while the third strap pulling mechanism 6 and the fourth strap pulling mechanism 7 clamp and pull the strap by clamping the free end of the strap from upper and lower sides.

The present disclosure also provides a strap pulling method, which can be implemented by the strap pulling device according to the above-mentioned embodiment, comprising:

controlling the first strap pulling mechanism 2 to clamp the strap at the pulling position A located upstream of the cutting position B, and pull the clamped strap to the transfer position C located downstream of the cutting position B;

controlling the second strap holding mechanism 3 to clamp the strap at the pulling position A when the first strap pulling mechanism 2 pulls the strap to the transfer position;

controlling the cutter mechanism 1 to cut the strap at the cutting position B to acquire a strap segment having a predetermined length;

controlling the first strap pulling mechanism 3 to pull the clamped strap to the transfer position C; and controlling the first strap pulling mechanism 2 to clamp the strap at the pulling position A and pull the next section of the strap when the second strap pulling mechanism 3 pulls the strap to the transfer position C.

Optionally, the strap pulling method according to an embodiment of the present disclosure further comprises:

controlling the strap transfer mechanism to clamp the end of the strap located at the transfer position C and pull the strap segment to the downstream position D when the first strap pulling mechanism 2 or the second strap pulling mechanism 3 pulls the strap to the transfer position C.

The disclosure has been described above in sufficient detail with certain particularities. Those of ordinary skill in the art should understand that the descriptions in the embodiments are only exemplary, and all changes made without departing from the true spirit and scope of the present disclosure should belong to the protection scope of the present disclosure. The claimed scope of the present disclosure is defined by the claims, rather than by the above description in the embodiments.

REFERENCE SIGNS LIST

In FIG. 1 to FIG. 5:
1 cutter mechanism; 2 first strap pulling mechanism; 3 second strap pulling mechanism; 4 holding mechanism; 5 clamping mechanism; 6 third strap pulling mechanism; 24 fourth strap pulling mechanism; 8 mounting base; 9 first guide rail; 10 second guide rail; 21 sliding bracket; 22 mounting plate; 23 first jaw; 24 second jaw;

A pulling position; B cutting position; C transfer position; D downstream position.

What is claimed is:

1. A strap pulling device, comprising a cutter mechanism, a first strap pulling mechanism, a second strap pulling mechanism, a third strap pulling mechanism and a fourth strap pulling mechanism, wherein the first strap pulling mechanism and the second strap pulling mechanism are configured to alternately clamp a strap at a pulling position located upstream of a cutting position, and pull the clamped strap to a transfer position located downstream of the cutting position, wherein the strap pulling device is configured to implement a first operation comprising that the first strap pulling mechanism pulls the clamped strap from the pulling position passing the cutting position directly to the transfer position, the second strap pulling mechanism clamps the strap at the pulling position, and the cutter mechanism cuts the strap at the cutting position to acquire a strap segment having a predetermined length, and one of the third strap pulling mechanism or the fourth strap pulling mechanism clamps the strap pulled to the transfer position and pull the strap segment to a downstream position located downstream of the transfer position, and wherein the strap pulling device is configured to implement a second operation comprising that the second strap pulling mechanism pulls the clamped strap from the pulling position passing the cutting position directly to the transfer position, the first strap pulling mechanism clamps the strap at the pulling position, and the cutter mechanism cuts the strap at the cutting position to acquire the strap segment having the predetermined length, and the other one of the third strap pulling mechanism or the fourth strap pulling mechanism clamps the strap pulled to the transfer position and pull the strap segment to the downstream position, and wherein a direction from the pulling position to the transfer position is the same as a direction from the transfer position to the downstream position.

2. The strap pulling device according to claim 1, characterized in that the strap pulling device further comprises a strap holding mechanism arranged between the cutting position and the transfer position, and the strap holding mechanism is configured to hold the strap pulled by the first strap pulling mechanism or the second strap pulling mechanism to the transfer position.

3. The strap pulling device according to claim 1, characterized in that the strap pulling device further comprises a clamping mechanism arranged upstream of the pulling position, and when the first strap pulling mechanism or the second strap pulling mechanism clamps the strap at the pulling position for the first time, the clamping mechanism clamps a free end of the strap.

4. The strap pulling device according to claim 1, characterized in that the strap pulling device further comprises a mounting base, a first guide rail and a second guide rail, wherein the first guide rail and the second guide rail are arranged side by side on the mounting base along an extending direction of the strap, the first strap pulling mechanism and the fourth strap pulling mechanism are slidably mounted on the first guide rail, and the first strap pulling mechanism slides along the first guide rail to realize position switching between the pulling position and the transfer position, the fourth strap pulling mechanism slides along the first guide rail to realize position switching between the transfer position and the downstream position, and the second strap pulling mechanism and the third strap pulling mechanism are slidably mounted on the second guide rail, and the second strap pulling mechanism slides along the second guide rail to realize position switching between the pulling position and the transfer position, the third strap pulling mechanism slides along the second guide rail to realize position switching between the transfer position and the downstream position.

5. A strap pulling device, comprising:
a cutter mechanism;
a first strap pulling mechanism;
a second strap pulling mechanism;
a third strap pulling mechanism; and
a fourth strap pulling mechanism,
wherein
the first strap pulling mechanism clamps a free end of a strap and pulls the strap from a pulling position to a transfer position, and the second strap pulling mechanism moves to the pulling position to clamp the strap, such that the first strap pulling mechanism and the second strap pulling mechanism simultaneously clamp the strap, wherein the pulling position is located upstream of a cutting position and the transfer position is located downstream of the cutting position; and wherein the cutter mechanism cuts the strap at the cutting position to acquire a strap segment having a predetermined length, wherein the strap pulling device is configured to implement a first operation comprising that the first strap pulling mechanism pulls the clamped strap from the pulling position passing the cutting position directly to the transfer position, the second strap pulling mechanism clamps the strap at the pulling position, and the cutter mechanism cuts the strap at the cutting position to acquire the strap segment having the predetermined length, and one of the third strap pulling mechanism or the fourth strap pulling mechanism clamps the strap pulled to the transfer position and pull the strap segment to a downstream position located downstream of the transfer position, and wherein the strap pulling device is configured to implement a second operation comprising that the second strap pulling mechanism pulls the clamped strap from the pulling position passing the cutting position directly to the transfer position, the first strap pulling mechanism clamps the strap at the pulling position, and the cutter mechanism cuts the strap at the cutting position to acquire the strap segment having the predetermined length, and the other one of the third strap pulling mechanism or the fourth strap pulling mechanism clamps the strap pulled to the transfer position and pull the strap segment to the downstream position, and wherein a direction from the pulling position to the transfer position is the same as a direction from the transfer position to the downstream position.

6. The strap pulling device according to claim 5, wherein after the cutter mechanism cuts the strap, the second strap pulling mechanism clamps a new free end of the strap at the pulling position.

7. The strap pulling device according to claim 6, wherein the second strap pulling mechanism pulls the strap from the pulling position to the transfer position, and the first strap pulling mechanism releases the strap segment and moves to the pulling position to clamp the strap, such that the first strap pulling mechanism and the second strap pulling mechanism simultaneously clamp the strap.

8. The strap pulling device according to claim 7, wherein the cutter mechanism cuts the strap at the cutting position to acquire another strap segment.

9. The strap pulling device according to claim 5, characterized in that
the strap pulling device further comprises a strap holding mechanism arranged between the cutting position and the transfer position, and
the strap holding mechanism is configured to hold the strap pulled by the first strap pulling mechanism or the second strap pulling mechanism to the transfer position.

10. The strap pulling device according to claim 5, characterized in that
the strap pulling device further comprises a clamping mechanism arranged upstream of the pulling position, and
when the first strap pulling mechanism or the second strap pulling mechanism clamps the strap at the pulling position for the first time, the clamping mechanism clamps the free end of the strap.

11. A strap pulling method implemented by a strap pulling device comprising a cutter mechanism, a first strap pulling mechanism, a second strap pulling mechanism, a third strap pulling mechanism and a fourth strap pulling mechanism, the method comprising:
alternately clamping a strap at a pulling position located upstream of a cutting position, and pulling the clamped strap to a transfer position located downstream of the cutting position, by the first strap pulling mechanism and the second strap pulling mechanism,
wherein in a first operation, the first strap pulling mechanism pulls the clamped strap from the pulling position passing the cutting position directly to the transfer position, the second strap pulling mechanism clamps the strap at the pulling position, and the cutter mechanism cuts the strap at the cutting position to acquire a strap segment having a predetermined length, and one of the third strap pulling mechanism or the fourth strap pulling mechanism clamps the strap pulled to the transfer position and pull the strap segment to a downstream position located downstream of the transfer position, and
wherein in a second operation, the second strap pulling mechanism pulls the clamped strap from the pulling position passing the cutting position directly to the transfer position, the first strap pulling mechanism clamps the strap at the pulling position, and the cutter mechanism cuts the strap at the cutting position to acquire the strap segment having the predetermined length, and the other one of the third strap pulling mechanism or the fourth strap pulling mechanism clamps the strap pulled to the transfer position and pull the strap segment to the downstream position, and wherein a direction from the pulling position to the transfer position is the same as a direction from the transfer position to the downstream position.

* * * * *